Sept. 2, 1952   D. W. McMURTRIE   2,609,212
TRAILER FOR FARM TRACTORS
Filed Oct. 24, 1950   2 SHEETS—SHEET 2
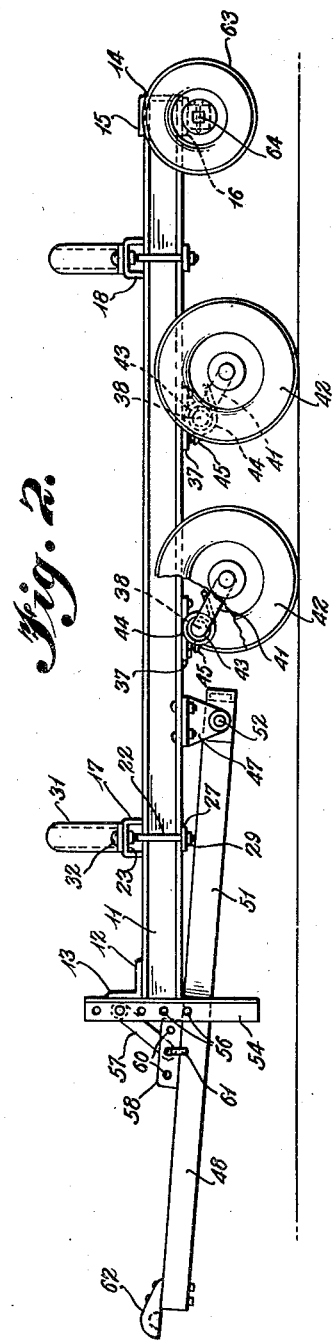
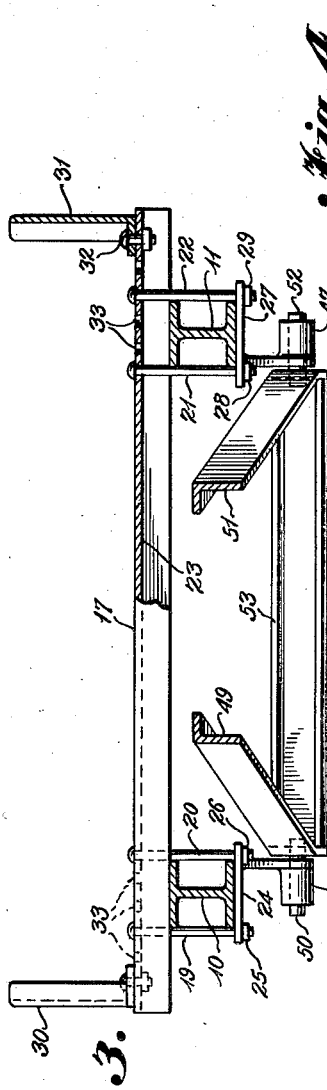
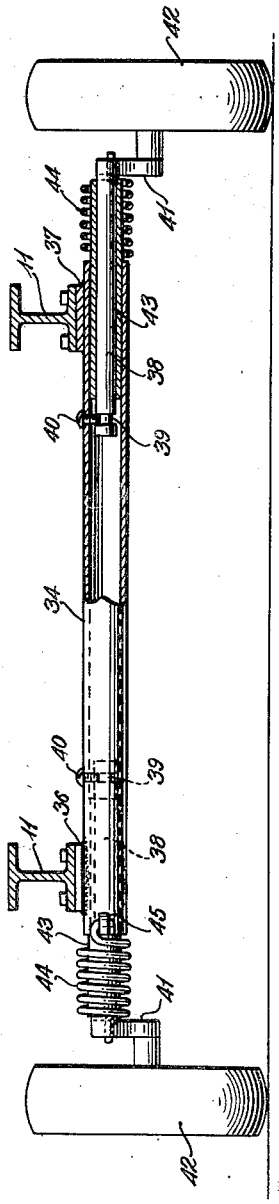
INVENTOR
Dallas W. McMurtrie
BY Burns Doane & Benedict
ATTORNEYS Patented Sept. 2, 1952

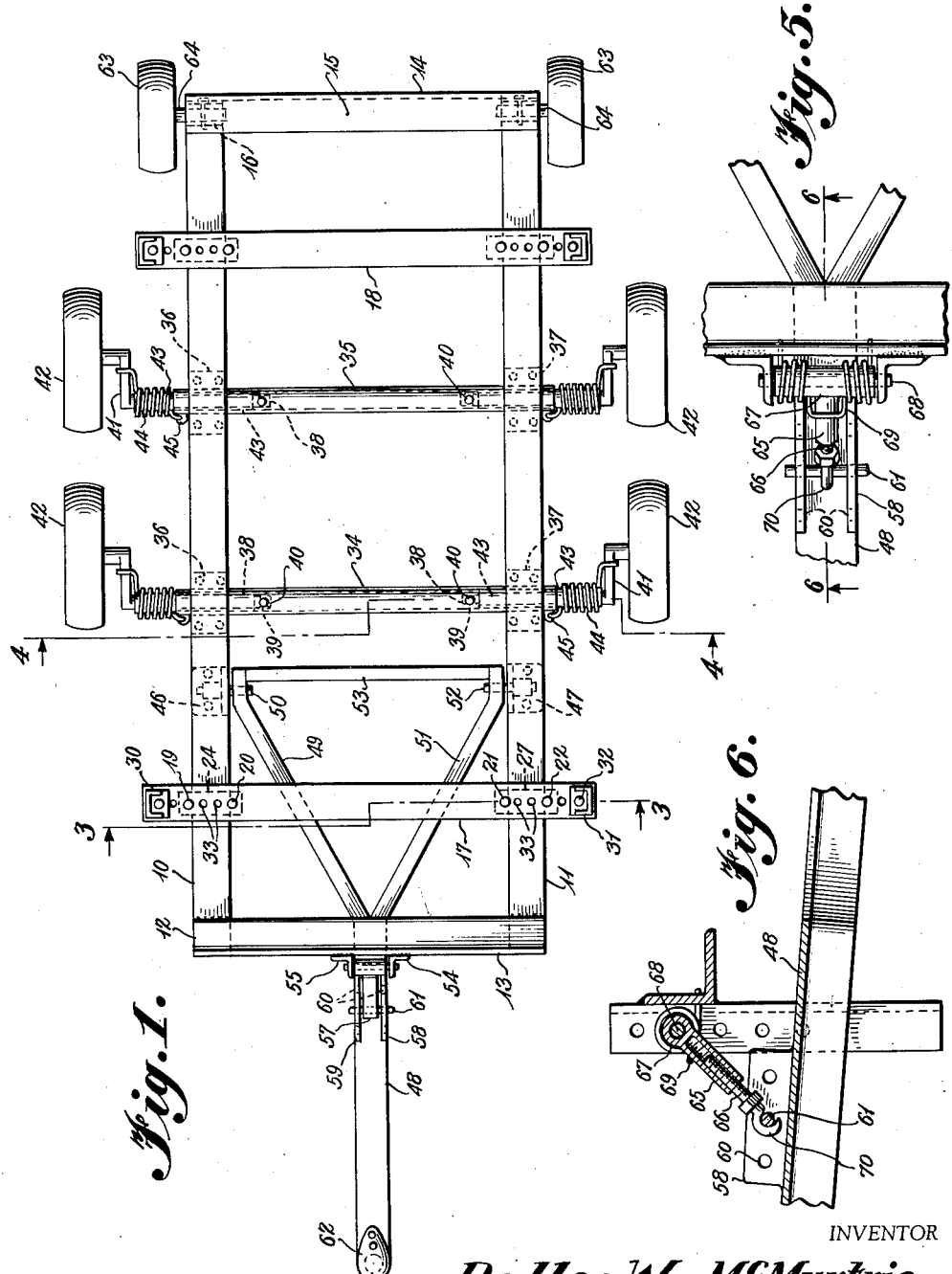

2,609,212

UNITED STATES PATENT OFFICE 2,609,212

TRAILER FOR FARM TRACTORS

Dallas W. McMurtrie, Veedersburg, Ind.

Application October 24, 1950, Serial No. 191,859

1 Claim. (Cl. 280—33.2)

The present invention relates to a trailer for farm tractors and more specifically to a trailer of great maneuverability and general utility adapted to be coupled directly to a farm tractor to be drawn thereby.

Commercial embodiments of trailers for use with farm tractors are presently of two general forms, i. e., four-wheeled trailers and two-wheeled trailers. When four-wheeled trailers are provided, they conventionally employ a fifth wheel mechanism for steering the front wheels in the same manner in which wagons have been steered for years. The employment of a four-wheeled trailer for use with a farm tractor which has its front wheels mounted on an axle pivoted to the trailer frame has been found to give serious difficulty, particularly in backing up the trailer when hooked to a tractor. The front and rear wheels do not track unless the front axle is maintained exactly parallel with the rear axle, which parallelism is highly difficult to maintain when the front end of the tongue or draw bar of the tractor must be pivotally connected to the draw bar of the tractor. Furthermore, conventional four-wheeled trailers occasion difficulty because of the clamping of the front wheel under the body or frame of the trailer in the handling thereof. The two-wheeled trailer, on the other hand, is exceedingly unstable and is inclined to tilt about the axle which acts as a fulcrum for the trailer frame and body.

It is among the purposes and objects of the present invention to provide a highly maneuverable trailer adapted for use with farm tractors which possesses the usual advantages of a four-wheeled trailer while overcoming the disadvantages encountered with the conventional types of four-wheeled trailers. It is also the purpose and object of the invention to provide a trailer that will be easily backed up by the tractor because the front and rear wheels are so assembled that they must track in all positions assumed thereby. It is a more specific object of the invention to provide a trailer for use with farm tractors which can be dumped without being unhitched from the tractor and which lends itself to ready association with the hydraulic equipment carried by the tractor for effecting dumping thereof. It is a still more specific object of the invention to provide a trailer for use with farm tractors embodying a draw bar pivotally connected below the main trailer frame at a point well back of the front end thereof in association with means for releasably interlocking the front end of the trail frame and draw bar in fixed relationship.

It is still a further and more specific object of the invention to provide a trailer for use with farm tractors which avoids the employment of leaf springs and overcomes the difficulty incident to the tendency to twist of such springs and to provide means whereby torsional strains are absorbed by rigid members as distinguished from leaf spring structures. It is still a further object of the invention to provide a trailer for use with farm tractors that may be economically produced, that will have long life and give effective service in use and which is of general utility.

The invention will be described in connection with the accompanying drawings in which Figure 1 is a plan view of the trailer of the present invention illustrating the same without any bed or other structure disposed thereon.

Figure 2 is a side elevational view with parts broken away of the trailer as shown in Figure 1.

Figure 3 is a detailed cross-sectional view taken on the line 3—3 of Figure 1.

Figure 4 is a detailed cross-sectional view taken on the line 4—4 of Figure 1.

Figure 5 is a detailed plan view of a modified form of releasable connection between the trailer frame and draw bar, and Figure 6 is a cross-sectional view along the line 6—6 of Figure 5.

Referring to Figures 1 and 2, it will be observed that the main frame of the trailer is comprised of the longitudinally extending I-beam members 10 and 11 that form the side members of the frame. The front ends of the side members 10 and 11 are connected together by the angle bar 12 which is preferably welded to the top face of the side members 10 and 11 with the flange 13 thereof projecting vertically or at right angles to the tops of the members 10 and 11 as shown in Figure 2. The rear ends of the side members 10 and 11 are received within the channel member 14 which has its upper flange 15 and lower flange 16 welded to the upper and lower faces respectively of the side members 10 and 11. It will be observed that this construction provides a rigid rectangular main frame. There are provided for assembly on the main frame a front bolster indicated generally at 17 and a rear bolster indicated generally at 18. The bolsters 17 and 18 are interchangeable and alike in all respects and therefore one only of these bolsters need be described in detail.

By reference to Figure 3 it will be noted that the bolster 17 is adapted to be clamped to each of the side members 10 and 11 by bolts 19, 20, 21 and 22 which extend through suitable openings in the U-shaped transverse bar 23 of the bolster 17. The lower ends of the pair of bolts 19 and 20 extend through a clamping plate 24 which may be tightly clamped against the bottom face of the side bar 10 by the nuts 25 and 26. There is associated with the pair of bolts 21 and 22 a similar clamping plate 27 which is adapted to be clamped against the lower face of the bar 11 by the nuts 28 and 29. It will thus be seen that by merely loosening the nuts 25, 26 and 28—29 the front bolster 17 may be shifted longitudinally of the main frame and firmly clamped thereto in any desired position of adjustment. Uprights 30 and 31 are bolted to the opposite ends of the U-shaped transverse member 23 of the bolster 17 by bolts 32 (see Figure 3) which are adapted to extend through openings in flanges at the lower ends of the respective uprights 30 and 31.

A series of extra openings 33 are provided near each end of the transverse U-shaped member 23 of the bolster 17. These openings 33 may serve a variety of purposes. First, they permit of adjustment of the uprights 30 and 31 to points respectively closer and farther apart to accommodate wagon frames of varying width. Secondly, when the uprights 30 and 31 are in the position shown in Figure 3, a bed may, if desired, be securely affixed to the bolsters by merely passing bolts through the bottom of the bed thence through selected openings 33 and thereby bolting the bed in position on the trailer frame. This procedure is desirable where the bed is to be employed for carrying loads that are desired to be dumped without disturbing the positioning of the bed on the trailer frame. As above indicated, the rear bolster 18 is constructed in all respects similarly to the bolster 17 and may be adjusted longitudinally of the main frame in the same manner as hereinabove pointed out with respect to the bolster 17.

Referring again to Figure 1, it will be observed that at a point a short distance forward of the longitudinal center of the main frame there is affixed thereto a transverse tubular member 34 and a like tubular member 35 is affixed to the frame a short distance to the rear of the longitudinal center of the frame. The tubular members 34 and 35 are similar in all respects and only one need be described in detail. The tubular member 34 is shown in detail in Figure 4 where it will be observed that it is secured to the bottom face of the side members 10 and 11 of the main frame through the medium of plates 36 and 37 which may be suitably welded to the tubular member 34. The plates 36 and 37 are both respective to the side bars 10 and 11. The arrangement is such that in the case of wear and breakage of either of the tubular members 34, they may be readily removed from the main frame and repaired or replaced.

There is mounted in each end of each of the tubular members 34 and 35 a bell crank type stub axle 38. Since these stub axles are all alike, the same reference character has been applied to each and only one need be described in detail. These stub axles are best illustrated in Figure 4 where it will be observed that adjacent the inner end of each stub axle 38 there is a cut-out channel 39 into which the end of a retaining screw 40 is adapted to extend. The screw 40 extends through the wall of either tubular member 34 or 35 as the case may be with its inner end received in the channel 39. It thus acts to prevent longitudinal displacement of the stub axle 38 with respect to its associated tubular member while permitting relative rotation of the stub axle with respect to its associated tubular member 34 or 35. Stub axles 38 are in reality constructed in the form of bell crank levers with the crank portion 41 thereof disposed at right angles to the portions of the stub axle 38 that are received respectively within the tubular members 34 and 35 and within the hubs of the respective wheels 42. A wear-resistant bearing 43 is adapted to be press-fitted on each of the stub axles 38 and to be received with the stub axle within the open ends of the tubular members 34 and 35. About each stub axle 38 there is positioned a coil spring 44 having one end 45 thereof anchored to one of the tubular members 34—35 as more particularly shown at the left hand end of 34. The opposite end of each coil spring 44 is anchored in a position above the crank portion 41 of the associated stub axle 38 in the position shown in Figure 2. The arrangement is such that each coil spring 44 resists movement of the associated wheel 42 upwardly in the direction of the main frame of the trailer. No torsional twists incident to the steering of the trailer are, however, transmitted to the coil springs 44. Any such torsional twists are transmitted directly to the stub axles 38 and the crank arms 41 thereof which are of rugged construction, well adapted to withstand any such strain. It will be observed that when any one of the wheels 42 runs over an obstruction such as a stone or the like, it is free to move upwardly toward the main frame of the trailer against the force of the associated coil spring 44. Likewise, the coil springs 44 cushion any load that is placed on the trailer.

It is particularly to be observed that the tubular members 34 and 35 are positioned relatively close together and in reasonably close proximity to the longitudinal center of the main frame of the trailer. With this arrangement, the trailer is rendered extremely maneuverable when drawn by a tractor. Furthermore, the members 34 and 35 with their associated stub axles 38 are positioned sufficiently close to the longitudinal center of the trailer frame to permit pivoting the frame about either of these transverse points of support thereof, thus facilitating dumping of the trailer without detaching it from the tractor.

Coming now to the manner in which the trailer is adapted to be connected to the tractor, it will be observed that a pair of bearing members 46 and 47 are secured to the lower faces of the frame members 10 and 11 in transverse alignment and at a point approximately one-third of the distance back from the front end of the main trailer frame toward the rear end thereof. A Y-shaped draw bar indicated generally at 48 has one of its diverging legs 49 mounted on a pivot member 50 carried in the bearing member 46. The complemental diverging arm 51 of the draw bar 48 is pivotally mounted on pivot member 52 which extends through the bearing 47. The rear ends of the diverging members 49 and 51 of the draw bar are connected together by the transverse bar 53 which is suitably welded to the rear ends of the diverging members 49 and 51. It will thus be observed that the draw bar 48 is pivotally connected to the main frame of the trailer below the same rearwardly of the front end of the frame. A pair of angle members 54 and 55 are arranged in spaced parallel relation and affixed in vertical position to the vertically extending flange 13 of the front cross bar 12 of the frame, the one flange of the angle bars 54 and 55 being welded to the vertical flange 13 of the bar 12. The other flange of each of the angle bars 54 and 55 projects forwardly from the front end of the frame and these forwardly projecting flanges of angle bars 54 and 55 are provided with complemental spaced apertures 56. A draw bar locking link 57 is adapted to be pivotally mounted in a selected pair of complemental openings 56. The lower end of the draw bar locking link 57 is also apertured and there are welded to the upper face of the draw bar 48 a pair of spaced-apart bars 58 and 59 provided with complemental apertures 60. A removable pin 61 is adapted to be passed through a selected pair of complemental apertures 60 and through the aperture in the lower end of the draw bar locking link 57 to thereby hold the draw bar 48 in fixed relation to the trailer frame in any one of a number of selected positions. This permits the accommodation of the trailer to the draw bars in various makes of tractors and it likewise permits the obtaining of an even pull on the load. The forward end of the draw bar 48 is provided with a suitable hook 62 or other appropriate means for attachment to the draw bar of a tractor.

While not an essential feature of the invention, I have found it advantageous to mount a pair of small wheels 63 on short, straight stub axles 64 at the rear end of the trailer frame to absorb shock when the trailer is being dumped and to permit movement of the trailer with facility while the bed carried on the frame is in tilted dumping position.

It will be understood that when it is desired to dump the trailer the pin 61 is withdrawn from the locking pin 57 and the forward end of the trailer frame raised which will cause the same to pivot about the stub axles carried by the tubular member 35. It will be appreciated that the hydraulic mechanism of the tractor can be employed for raising the forward end of the trailer frame which can be accomplished by any suitable hoist mechanism.

In Figures 5 and 6, a modified form of draw bar locking mechanism is disclosed. The construction in this modification is in all respects the same as described for the modification of Figures 1-4 with the exception of the specific nature of the draw bar locking link which in the modification of Figures 5 and 6 takes the form of a two-part extensible link embracing the internally threaded sleeve 65 and the threaded shank 66 which are received within the threaded bore of the sleeve 65. The upper end of the sleeve 65 carries a transverse bearing member 67 for receiving a pivot pin 68 which extends through selected complemental apertures 56 in the angle bars 54 and 55 at the front of the trailer frame. A double coil spring 69 has its opposite ends coiled about the bearing member 67 with a central portion looped around the sleeve 65. The arrangement is such that the coil spring 69 urges the locking link into a position effective to maintain the hook 70 carried at the lower end of the shank 66 in engagement with the pin 61 which, as hereinabove described, extends through a selected pair of complemental openings 60 in the bars 58 and 59 carried by the draw bar 48. In the modification of Figures 5 and 6 it is not necessary to remove the pin 61 in order to release the trailer frame from the draw bar. It is only necessary to force the hook 70 out of engagement with the pin 61 and when the frame and draw bar are again brought into proper relationship, the hook 70 can be again engaged with the pin 61 and the spring 69 will act to prevent accidental release thereof.

Having thus described my invention, what I claim is:

A trailer adapted to be drawn by a tractor, comprising a main frame, a plurality of bed-supporting bolsters adjustably secured to said main frame, a Y-shaped draw bar having the ends of its diverging legs pivotally connected to the under side of said main frame at a point approximately one-third of the distance from the front end to the back end of said frame whereby tilting of the trailer frame for dumping a load carried thereby may be facilitated, releasable connecting means for locking the front end of said frame in fixed relation to said draw bar to preclude tilting of said main frame when drawing force is applied to said draw bar, a pair of spaced tubular axle-supporting members connected to the under side of said main frame, one of said members positioned a short distance forwardly of the center of said frame and the other of said members positioned a short distance rearwardly of the center of said frame, crank stub axles, one of said stub axles positioned in each end of said tubular members, a wheel mounted on the outer end of each crank stub axle, a coil spring surrounding the portion of each stub axle outwardly of the tubular member, and anchored at one end to the adjacent end of the tubular member, the other end of said coil spring engaging the intermediate arm of said crank axle to resist movement of the wheel mounted on the associated stub axle toward said main frame.

DALLAS W. McMURTRIE.

REFERENCES CITED

The following references are of record in the file of this patent:

UNITED STATES PATENTS

| Number | Name | Date |
| --- | --- | --- |
| 1,938,847 | Masury | Dec. 12, 1933 |
| 2,227,762 | Ronning | Jan. 7, 1941 |
| 2,387,504 | Farr | Oct. 23, 1945 |
| 2,426,513 | Linn | Aug. 26, 1947 |
| 2,505,421 | McMurtrie | Apr. 25, 1950 |